Nov. 10, 1959   H. W. SCHULT   2,912,282
BLOW OFF CONVEYOR DEVICE FOR PAPER CUPS OR THE LIKE
Filed May 16, 1957   2 Sheets-Sheet 1
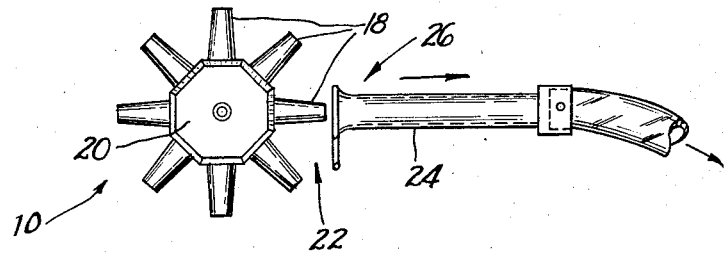
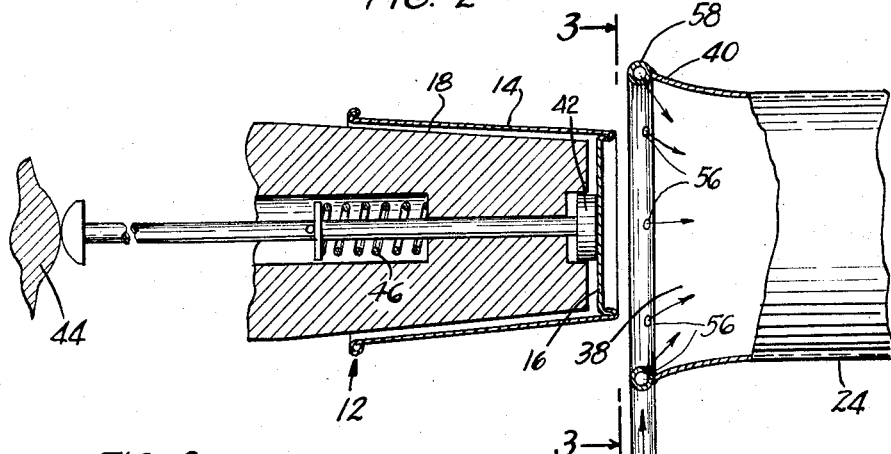
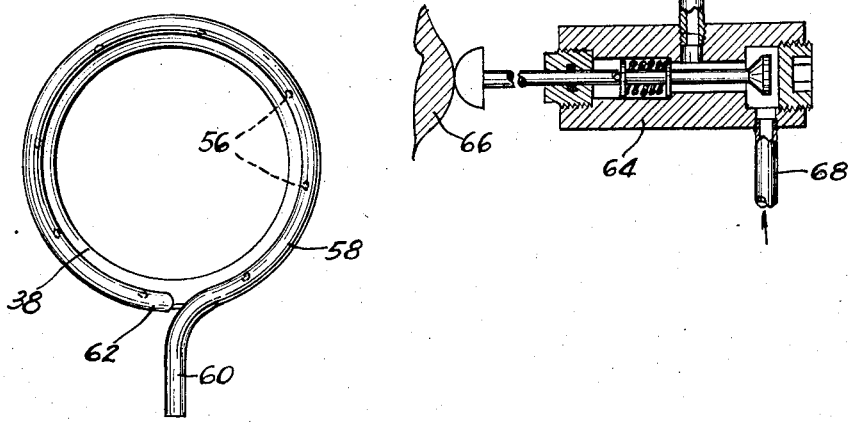
INVENTOR.
Hans W. Schult
BY
Ooms, McDougall, Williams & Hersh
Attorneys Nov. 10, 1959  H. W. SCHULT  2,912,282
BLOW OFF CONVEYOR DEVICE FOR PAPER CUPS OR THE LIKE
Filed May 16, 1957  2 Sheets-Sheet 2

INVENTOR.
Hans W. Schult
BY
Ooms, McDougall, Williams & Hersh
Attorneys

United States Patent Office 2,912,282
Patented Nov. 10, 1959

2,912,282
BLOW OFF CONVEYOR DEVICE FOR PAPER CUPS OR THE LIKE

Hans W. Schult, Chicago, Ill., assignor to Solo Cup Company, Chicago, Ill., a corporation of Delaware Application May 16, 1957, Serial No. 659,643

3 Claims. (Cl. 302—2)

This invention relates to machines for making, processing or handling paper cups or similar articles.

One object of the present invention is to provide a new and improved blow off device utilizing compressed air for removing paper cups from a carrier on a cup machine, or the like.

A further object is to provide a new and improved blow off device whereby the cups are sucked into a discharge tube and are conveyed along the tube by the compressed air.

It is another object to provide a new and improved blow off device which is so arranged that the compressed air acts entirely on the outside of the paper cups, whereby any possible contamination of the inside is avoided.

A further object is to provide a new and improved blow off device which is remarkably simple and low in cost yet is extremely effective in operation.

Further objects and advantages of the present invention will appear from the following description, taken with the accompanying drawings, in which:

Fig. 1 is a somewhat diagrammatic plan view showing a cup machine equipped with a blow off device to be described as one illustrative embodiment of the present invention.

Fig. 2 is a fragmentary enlarged somewhat diagrammatic horizontal sectional view showing the blow off device in greater detail.

Fig. 3 is an elevational view, taken as indicated by the line 3—3 in Fig. 2.

Figure 4:
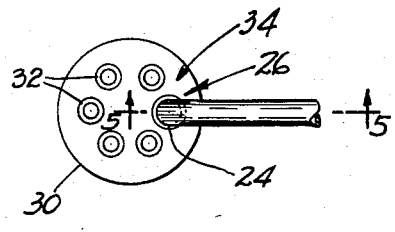
Fig. 4 is a somewhat diagrammatic plan view of a modified blow off device to be described as a second illustrative embodiment of the invention.

As already indicated, Fig. 1 constitutes a diagrammatic illustration of a cup machine 10 adapted to make, process or handle paper cups 12, only one of the cups being shown. It will be seen that the illustrated cup 12 is of the flat-bottomed type, with a downwardly tapering frusto-conical side wall 14 and a flat, generally disk-shaped bottom wall 16. However, the invention is applicable to other types of paper cups and similar articles.

The machine 10 is equipped with a plurality of carriers 18 adapted to receive and carry the paper cups 12. In this case, the carriers 18 take the form of tapered, frusto-conical mandrels mounted on a rotatable turret 20 and extending radially therefrom. The turret 20 is adapted to be advanced so as to carry each of the mandrels 18 in turn to a discharge station 22, at which the paper cups are removed from the mandrels 18 and carried away through a discharge tube 24. A blow off device 26 is provided to remove the cups from the mandrels 18 by the action of compressed air, and to convey the cups along the tube 24 by the action of the air.

Figure 5:
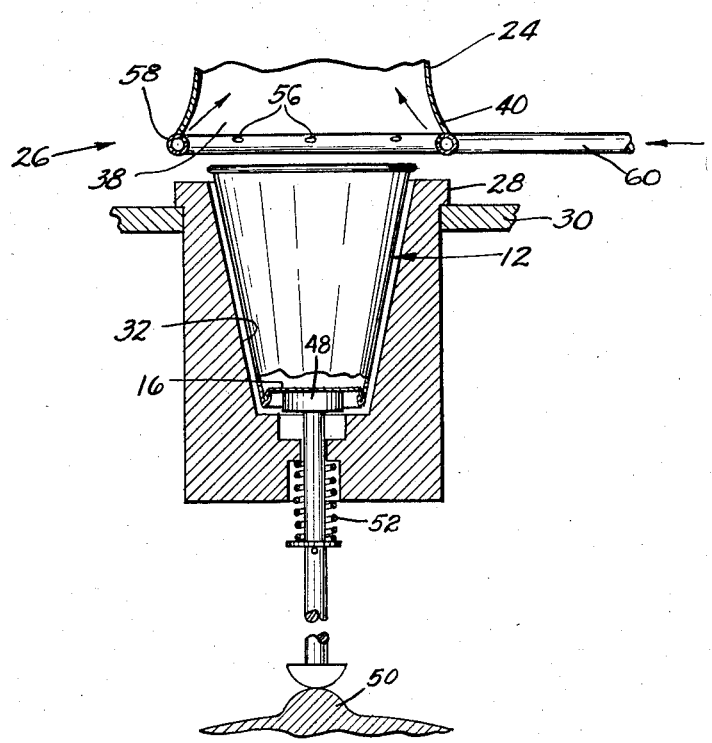
Fig. 5 is a fragmentary enlarged elevational sectional view taken generally along a line 5—5 in Fig. 4.

Figs. 4 and 5 illustrate a somewhat modified overall arrangement, which, however, employs the same blow off device 26. In the arrangement of Figs. 4 and 5, the cups are adapted to be received in carriers 28 mounted on a rotatable turntable or turret 30. Each of the carriers 28 has an upwardly opening, frusto-conical pocket or cavity 32 therein for receiving one of the cups 12 in an upright position. The turntable 30 is adapted to bring each of the carriers 28 in turn to a discharge station 34, where the cups 12 are removed from the pockets 32 and are conveyed away through the discharge tube 24 of the blow off device 26. It will be understood that the blow off device may be employed for removing paper cups or the like from various other types of carriers.

It will be seen that the discharge tube 24 is axially aligned with the paper cup 12 at the discharge station. Thus, in Fig. 1, the discharge tube 24 is axially aligned with the carrier mandrel 18 at the discharge station 26. In Figs. 4 and 5, the discharge tube 24 is axially aligned with the pocket 32 in the carrier 28 at the discharge position 34. The discharge tube 24 has an open end 38 which defines the entrance to the discharge tube. The open end or entrance 38 is opposite and closely spaced from one end of the paper cup 12 at the discharge station. Thus, in Figs. 1 and 2, the open end 38 is opposite and closely spaced from the outer end of the mandrel 18 at the discharge position, so that the lower end of the cup 12 is presented to the open end 38 of the tube 24. In Figs. 4 and 5, the open end 38 is opposite and closely spaced from the pocket 32 at the discharge position so that the top or mouth end of the paper cup 12 is presented to the tube 24. The illustrated tube 24 has an outwardly flared end portion 40 to guide and receive the paper cup 12.

It is preferred to provide means for loosening the paper cup 12 from the carrier at the discharge station. Thus, each of the mandrels 18 of Figs. 1 and 2 is provided with a plunger or pusher 42 which is movable axially against the inside of the bottom wall 16 so as to push the cup 12 outwardly to a slight extent with respect to the mandrel 18. The plunger 42 may be operated by any suitable means, such as the illustrated cam 44. A return spring 46 is provided to retract the plunger 42 when the mandrel 18 leaves the discharge station 22.

Each carrier 28 of Figs. 4 and 5 is equipped with a similar plunger or pusher 48 which is movable axially against the outside of the bottom wall 16, so as to loosen the cup 12 from the pocket 32. A cam 50, or other suitable means, may be provided to actuate the plunger 48, against the force of a return spring 52.

When the cup 12 has been loosened, the blow off device 26 draws it into the tube 24. For this purpose, the blow off device 26 is provided with a plurality of air jets 56 which are angularly spaced around and adjacent the entrance 38 to the tube 24. It will be seen that the air jets 56 are arranged to direct high velocity streams or jets of air into the tube 24 at angles having axial and radial components. In this case, each jet is directed at an angle of about 50° to the axis of the tube 24, but it will be understood that the angle of the jets may be varied. Eight of the jets 56 are provided in the illustrated construction, but the number of jets may also be varied.

As illustrated, the air jets 56 take the form of orifices in an air conduit or pipe 58 which is bent into annular or ring-shaped form, as shown to best advantage in Fig. 3. The ring-shaped pipe 58 is axially aligned with the discharge tube 24 and is secured to the flared end portion 40 thereof. The pipe 58 has an end portion 60 which extends outwardly and is adapted to be connected to a supply of compressed air. At the other end, the pipe 58 has a closed end portion 62.

The air conduit 58 may be supplied continuously with compressed air. This arrangement is utilized in the embodiment of Figs. 4 and 5. However, in the embodiment of Figs. 1–3, the air pipe 58 is supplied with compressed air intermittently, in timed relation to the movement of each mandrel 18 to the discharge station 22. This may be done by connecting the pipe 58 to an air supply valve 64 which is operated by suitable timing means, such as the illustrated cam 66. Compressed air is supplied continuously to the valve 64 through a pipe 68. The cam 66 opens the valve 64 when each mandrel 18 is indexed to the discharge position 22.

In the operation of the blow off device 26, the high velocity streams of compressed air from the jets 56 have the effect of sucking the paper cup 12 off its carrier 18 or 26 and into the discharge tube 24. The compressed air then picks up the cup and shoots it through the tube 24 to any desired point. It is believed that the high velocity jets of air induce the flow of outside atmospheric air into the entrance 38 to the tube 24. The cup 12 is carried into the tube 24 by the inflow of air.

Expressing the action in another way, the air jets 56 produce a zone of reduced air pressure immediately inside and adjacent the entrance 38 to the tube 24. The atmospheric air on the opposite side of the cup from the zone of reduced pressure pushes the cup into the discharge tube 24.

The action of the blow off device is positive, effective and noncritical. The blow off device will draw off the cups either bottom first, as illustrated in Figs. 1 and 9, or mouth first, as illustrated in Figs. 4 and 5. The cups need be loosened only slightly from their carriers in order to free them for withdrawal into the discharge tube by the blow off device. It will be apparent that the air jets are directed inwardly at the outside of the cup. This arrangement avoids contamination of the inside of the cup by any oil, moisture, or other foreign material that may be present in the compressed air. With all its advantages, the blow off device is remarkably simple and low in cost.

Various modifications, alternative constructions and equivalents may be employed without departing from the true spirit and scope of the invention as exemplified in the foregoing description and defined in the following claims.

I claim:

1. In a machine for making paper cups, the combination comprising a generally conical cup carrier movable to a discharge station, said carrier having means adapted to receive and interfit coaxially with a paper cup, a discharge tube extending from said discharge station and disposed coaxially relative to said carrier and the cup carried thereby when at said station, said tube having an open end forming an entrance opposite said carrier and closely spaced from said carrier and the cup carried thereby when at said station, a plurality of air jets disposed in an annular pattern coaxially with said carrier around said entrance to said tube and directed at an angle with axial and radial components into said tube, mechanical pusher means on said carrier for engaging and slightly loosening the cup therefrom, and means for supplying compressed air to said air jets for inducing movement of air into said tube and thereby sucking the cup off said carrier and into said tube.

2. In a cup machine, the combination comprising a generally conical cup mandrel movable to a discharge station, said mandrel being adapted to receive and interfit with a paper cup, a discharge tube extending from said discharge station and disposed in axial alignment with said mandrel and the cup carried thereby when at said discharge station, said tube having an open end forming an entrance opposite and closely spaced from the outer end of said mandrel and the bottom end of the cup when at said discharge station, a plurality of angularly spaced air jet means disposed in an annular pattern around and adjacent said entrance coaxially with said carrier and directed into said tube at angles having axial and radial components, movable plunger means on said mandrel and operative to engage and slightly loosen the paper cup therefrom, and means for supplying compressed air to said air jet means for inducing flow of air into said tube and thereby sucking the paper cup off the mandrel and into said tube.

3. In a cup machine, the combination comprising a cup carrier movable to a discharge station, said carrier having a generally conical pocket therein adapted to receive and interfit with a paper cup, a discharge tube leading from said discharge station and disposed in axial alignment with said pocket and the paper cup carried thereby when at said discharge station, said tube having an open end defining an entrance opposite and closely spaced from said pocket and the mouth end of the paper cup carried thereby when at said discharge station, a plurality of angularly spaced air jet means disposed at an annular pattern around and adjacent said entrance coaxially with said pocket, each of said air jet means being directed into said tube at an angle having axial and radial components, movable plunger means on said carrier for engaging and slightly loosening the paper cup from said pocket, and means for supplying compressed air to said air jet means for inducing flow of air into said cup and thereby sucking the cup mouth foremost into said tube.

References Cited in the file of this patent

UNITED STATES PATENTS

| | | |
|---|---|---|
| 2,367,884 | Munroe | Jan. 23, 1945 |
| 2,785,610 | Meyer-Jagenberg | Mar. 19, 1957 |

FOREIGN PATENTS

| | | |
|---|---|---|
| 701,793 | France | Jan. 13, 1931 |